(12) United States Patent
Paukshto et al.

(10) Patent No.: US 7,144,608 B2
(45) Date of Patent: Dec. 5, 2006

(54) COLOR CORRECTING POLARIZER

(75) Inventors: Michael V. Paukshto, Foster City, CA (US); Louis D. Silverstein, Scottsdale, AZ (US)

(73) Assignee: Nitto Denko Corporation, Osaka (JP)

( * ) Notice: Subject to any disclaimer, the term of this patent is extended or adjusted under 35 U.S.C. 154(b) by 73 days.

(21) Appl. No.: 10/465,083

(22) Filed: Jun. 18, 2003

(65) Prior Publication Data
US 2004/0146663 A1 Jul. 29, 2004

Related U.S. Application Data

(60) Provisional application No. 60/442,440, filed on Jan. 24, 2003.

(51) Int. Cl.
G02F 1/01 (2006.01)
G02F 1/3363 (2006.01)

(52) U.S. Cl. ............... 428/1.31; 349/97; 349/106; 353/84; 252/299.62; 544/342

(58) Field of Classification Search ............... 428/1.1, 428/1.3, 1.31; 349/94, 96–97, 104, 106; 353/84; 252/299.62, 299.01; 544/342–343, 544/353
See application file for complete search history.

(56) References Cited

U.S. PATENT DOCUMENTS

| | | | | |
|---|---|---|---|---|
| 2,527,593 A * | 10/1950 | Stadler | ........................ | 359/498 |
| 4,106,859 A * | 8/1978 | Doriguzzi et al. | ........... | 349/113 |
| 5,568,290 A * | 10/1996 | Nakamura | .................... | 349/96 |
| 5,718,838 A * | 2/1998 | Okazaki | .................... | 252/299.1 |
| 5,739,296 A | 4/1998 | Gvon et al. | | |
| 5,806,834 A * | 9/1998 | Yoshida | ........................ | 252/589 |
| 6,005,650 A * | 12/1999 | Kim et al. | .................... | 349/130 |
| 6,049,428 A | 4/2000 | Khan et al. | | |
| 6,245,399 B1 | 6/2001 | Sahouani et al. | | |
| 6,399,166 B1 | 6/2002 | Khan et al. | | |
| 6,429,915 B1 * | 8/2002 | Yeh et al. | ........................ | 349/96 |
| 6,437,123 B1 * | 8/2002 | Bock et al. | .................... | 544/216 |
| 6,476,892 B1 * | 11/2002 | Aminaka | .................... | 349/117 |
| 6,488,866 B1 | 12/2002 | Sahouani et al. | | |
| 6,583,284 B1 * | 6/2003 | Sidorenko et al. | .......... | 544/342 |
| 6,649,231 B1 * | 11/2003 | Ito | ............................. | 428/1.3 |
| 6,747,720 B1 * | 6/2004 | Saiki et al. | .................. | 349/122 |
| 6,784,954 B1 * | 8/2004 | Yamaoka et al. | ............. | 349/96 |
| 6,879,356 B1 * | 4/2005 | Hsieh et al. | .................. | 349/96 |
| 6,909,473 B1 * | 6/2005 | Mi et al. | ........................ | 349/5 |

(Continued)

FOREIGN PATENT DOCUMENTS

EP 01 014 119 A1 6/2000

(Continued)

OTHER PUBLICATIONS

McGill University, Barrett Research Group, Introduction to Liquid Crystals, Discotic Liquid Crystals [online], [retrieved on Dec. 29, 2005]. Retrieved from the internet <URL:http://www.barrettresearch.ca/teaching/liquid_crystal/LC04.htm>.*

(Continued)

*Primary Examiner*—Rena Dye
*Assistant Examiner*—Sow-Fun Hon
(74) *Attorney, Agent, or Firm*—Dorsey & Whitney LLP

(57) ABSTRACT

A color-correcting polarizer is provided comprising a polarizer layer and at least one discotic film layer. The discotic film layer is optically transparent within the range of visible wavelength. The discotic film layer works as a polarizer in the wavelength ranges at least from 380 to 500 nm and/or from 600 to 780 nm. A liquid crystal cell comprising the color correcting polarizer is also disclosed.

60 Claims, 10 Drawing Sheets

U.S. PATENT DOCUMENTS

| | | | |
|---|---|---|---|
| 6,942,925 B1 * | 9/2005 | Lazarev et al. | 428/432 |
| 6,965,473 B1 * | 11/2005 | Hayashi et al. | 359/491 |
| 7,015,990 B1 * | 3/2006 | Yeh et al. | 349/96 |
| 2002/0167632 A1 | 11/2002 | Lavrentovich et al. | |

FOREIGN PATENT DOCUMENTS

| | | |
|---|---|---|
| JP | 2000089188 | 3/2000 |
| JP | 2001100038 | 4/2001 |
| JP | 2001166138 | 6/2001 |
| JP | 2002148441 | 5/2002 |

OTHER PUBLICATIONS

Merriam-Webster's Collegiate Dictionary, tenth edition, 1999, p. 321, dichroic, dichroism.*

Khan, I. G., et al., "*P-51: Ultra Thin LCD Polarizers with High Dichroic Ratio Based on Lyotropic Dichroic Dyes*", 22nd International Display Research Conference, Nice, France (2002) pp. 573-575 (XP-009033776).

* cited by examiner

COLOR CORRECTING POLARIZER

RELATED APPLICATIONS

This application claims priority to U.S. Provisional Application No. 60/442,440 filed Jan. 24, 2003, the disclosure of which is hereby incorporated by reference in its entirety.

FIELD OF THE INVENTION

This invention relates in general to liquid crystal displays, and in particular to liquid crystal displays having color-correction polarizers.

BACKGROUND OF THE INVENTION

Most liquid crystal displays suffer from perceptually significant color errors. The spectral selectivity of liquid crystal layers is one of the origins responsible for wrong color rendering and grayscale coloring in liquid crystal displays.

The operation principle of a liquid crystal display requires a polarizer. The function of the polarizer is to selectively transmit or reflect light with a preferred direction of polarization. The unpolarized light transmitted through (or reflected by) linear polarizer has a polarization direction collinear with the so-called transmission axis of the polarizer.

The polarizing capability of a linear polarizer is characterized by the dichroic ratio. In reality, a small part of light with a polarization vector perpendicular to the transmission axis may be transmitted through a polarizer. Therefore, the transversal absorption coefficient ($k_\perp$) has a high but finite value. A small part of light with polarization vector parallel to the transmission axis may be absorbed by the polarizer, thus the longitudinal absorption coefficient ($k_\parallel$) has a relatively small non-zero value. The dichroic ratio is defined as:

$$K_d = \frac{k_\perp}{k_\parallel} \quad (1)$$

A high dichroic ratio means a high degree of polarization of the light transmitted through a polarizer.

Another important quality of a polarizer is the spectral dependency of the dichroic ratio. The transversal and longitudinal absorption coefficients are dependent on the wavelength of light. Therefore, the dichroic ratio is also wavelength-dependent. This dependence reveals itself in the coloration of the initially white light passed through the polarizer. The sample transmission spectrum of two perpendicularly crossed typical polarizers is shown in FIG. 1. The spectrum reveals a progressively increasing spectral leakage below about 550 nm, and a large, rapidly increasing leakage in the long wavelengths above approximately 680 nm. These leakages result in perceptible coloration of the polarizer. However, it should be noted that the sensitivity of the human visual system to wavelengths of 680 nm and above is extremely low and that most sources of illumination for LCDs have minimal intensity in this region. As a result the predominant source of coloration due to polarizer leakage is the short wavelength region.

The described coloration can take place in different types of polarizers. The value of the coloration depends on the particular type of the polarizer, but remains perceptible to the human eyes. The spectrum shown in FIG. 1 is characteristic of iodine-based polarizers. The iodine-based polarizers are widely used in liquid crystal displays due to their relatively high dichroic ratio. Other types of polarizers, including dichroic dye-based ones, are also subject to coloration.

The described polarizer coloration is one of the reasons of coloration of liquid crystal cells. The magnitude and significance of color errors and color variations will vary with the particular optical configuration of liquid crystal cells and display applications. In some cases, even relatively large color errors and variations may be well tolerated by consumers of low-cost monochrome liquid crystal displays. However, for color liquid crystal displays in general and high-performance, full-color active-matrix liquid crystal display panels (AM LCD) in particular, users have come to expect a level of color accuracy and stability commensurate with the high-quality color cathode ray tube displays in today's televisions and computer workstation monitors. The designated high level of liquid crystal cell color performance requires elimination of virtually all color errors and variations, including the coloration introduced by the polarizer.

In particular, the origin of color errors and color variations of liquid crystal cells can be traced to two principal causes: shifts in the peak of spectral transmission or reflection resulting from changes in the effective birefringence of the liquid crystal layer and phase retardation between polarization components, and departures from ideal polarization performance in real polarization control films as described above as coloration of the polarizer. The first source of color errors typically dominates at high gray levels and can often be effectively managed by reducing the birefringence and/or thickness of the liquid crystal layer. On the contrary, the polarizer-related coloration dominates at low gray levels and persists down to the black level of the display.

Accordingly, a simple, polarization-sensitive color correction applicable for both polarizers and liquid crystal cells is desirable. It is also desired to provide a color correcting means with high transparency in the visible wavelength region to retain high transparency of the polarizer or liquid crystal cell.

SUMMARY OF THE INVENTION

One objective of the present invention is to provide a polarizer and liquid crystal display having good color and grayscale rendering.

Another objective of the present invention is provide a polarizer and liquid crystal display with full correction of color shifts.

A further objective of the present invention is to eliminate the drawbacks of known polarizers and liquid crystal displays having cumbersome and complicated systems of color and grayscale correction.

These and other objectives are achieved by the color correcting polarizer of the present invention, which comprises a polarizer layer and at least one discotic film layer. The discotic film layer is optically transparent within the range of visible wavelengths. The discotic film layer works as a polarizer in the wavelength range at least from 380 to 500 nm and/or from 600 to 780 nm.

In one embodiment, a liquid crystal cell comprising the color correcting polarizer is provided. The liquid crystal cell comprises a front panel, a rear panel, liquid crystal placed between the front and rear panels, and a color correcting polarizer. The color correcting polarizer comprises at least one polarizer layer and at least one discotic film layer. The discotic film layer is optically transparent within the range of visible wavelengths and works as a polarizer in the wavelength ranges at least from 380 to 500 nm and/or from 600 to 780 nm.

BRIEF DESCRIPTION OF THE DRAWINGS

The invention will be more clearly understood from the following description when read in conjunction with the accompanying drawings in which.

DESCRIPTION OF THE PREFERRED EMBODIMENTS

Figure 1:
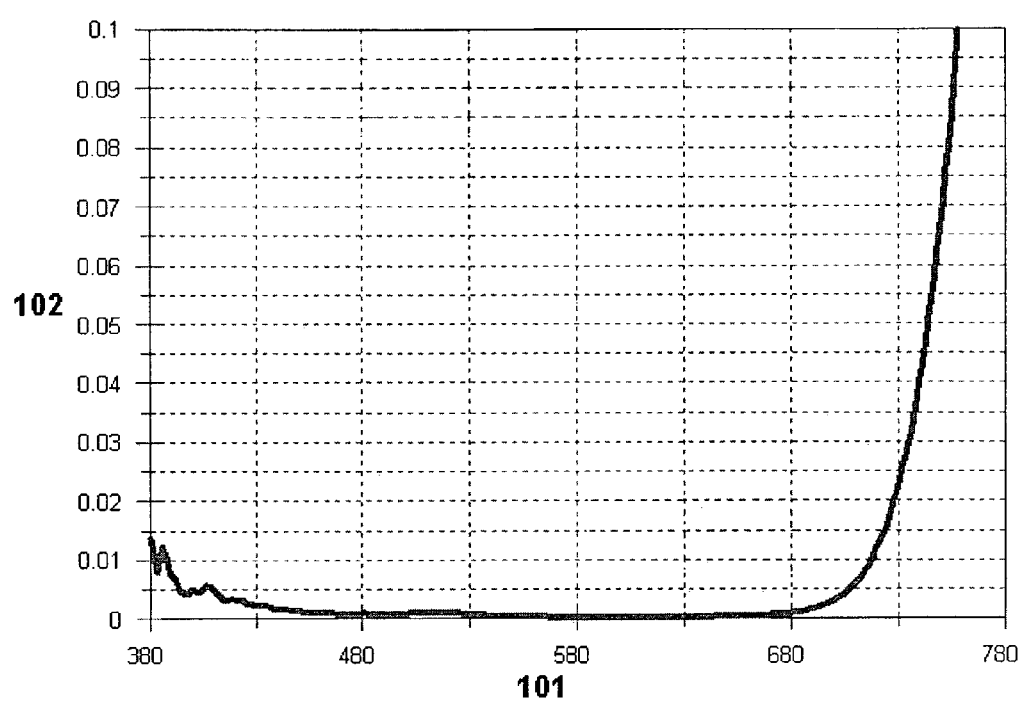
FIG. 1 is a transmission spectrum of a pair of typical iodine-based sheet polarizers with transmission axes crossed at 90°.

The present invention provides a discotic dye film-based color correcting polarizer that can be used in TFT displayers and liquid crystal displays (LCDs) such as twist nematic (TN) LCDs, vertical-alignment (VA) LCDs, in plane switching (IPS) LCDs, and passive LCDs.

Discotic dye-based films are potentially suitable devices for color correction. The use of dye materials for color correcting purposes is well known in the art. The combination of color correcting properties and polarizing capability is explicitly required for effective color correction of most types of LCDs since color errors are typically linked to particular polarization states. In addition, most discotic films have relatively high polarizing characteristics at oblique viewing angles. This feature is important because color imperfections related to polarizers become increasingly apparent at oblique angles. In addition, discotic films usually have retardation properties.

Color correcting effects can be obtained with the use of the thin crystalline film (TCF) polarizers as described in U.S. Pat. Nos. 5,739,296 and 6,049,428, the disclosures of which are hereby incorporated by reference. The TCF polarizers, available from Optiva, Inc, South San Francisco Calif., have small thickness and special properties, including high heat resistance and thermal stability with respect to temperature variations, high anisotropy of the refractive index, anisotropy of the absorption coefficient, E-type optical characteristic with a single extraordinary transmission axis and two ordinary absorption axes, high polarization properties at oblique angles, large dichroic ratio, and simple manufacturing process. These polarizers can be made from the discotic materials.

The color correcting polarizer of the present invention comprises a first polarizer layer having an imperfect color gamut, and a second discotic film layer. The discotic film layer works as a polarizer in the wavelength ranges from 380 to 500 nm and/or from 600 to 780 nm. The discotic film layer is optically transparent within the range of visible wavelength.

The color correcting polarizer can be used in liquid crystal cells, or in liquid crystal displays comprising the liquid crystal cells. The color correcting polarizer can perform color gamut and grayscale correction at normal and oblique viewing angles.

The liquid crystal cell of the invention comprises a plurality of layers, including a polarizer layer and at least one discotic film layer. The discotic film layer works as a polarizer in wavelength ranges at least from 380 to 500 nm and/or from 600 to 780 nm. The technical benefits of the present invention is the correction of the color gamut at normal and oblique angles of the liquid crystal cell. The present invention is applicable for correction of both the black and white states and any grayscale state of liquid crystal cells. The present invention also corrects color rendering of a polarizer.

In one embodiment of the present invention, the liquid crystal cell includes at least one polarizer layer and at least one additional discotic film polarizer layer, which together work as a polarizer in the full visible wavelength range and have a spectral transmission that is optimized for the particular liquid crystal display in order to correct the black or white or any grayscale states of the liquid crystal cell. The optimization includes the backlight, color filter, liquid crystal cell and other layer characteristics. The purpose of the optimization procedure is to have the combined property of a polarizer and color correcting film in one layer in order to have a less complicated and thinner structure of a liquid crystal display. The discotic film polarizer layer of this embodiment works as a polarizer in all visible wavelength range and also has the predetermined absorption peaks in the wavelength ranges from 380 to 500 nm and/or 600 to 780 nm.

Other multilayer structures are also possible which provide different combinations of at least one discotic film polarizer which works as a broad-band polarizer in the full visible wavelength region and one or more discotic film polarizer(s) which are added to serve as a color correcting film in some particular region.

The discotic film polarizer layer can be placed inside or outside of a liquid crystal cell. A discotic film polarizer layer with transmission axis parallel to the analyzer can correct the chromaticity of the black state, and one with the transmission axis perpendicular to the analyzer can correct the chromaticity of the white state. There is also another option when the discotic film layer is positioned inside the liquid crystal cell, where the transmission axis can be positioned at a specified angle with respect to the transmission axis of the analyzer. This allows the discotic film to be used as an optical retarder as well. The angle between the transmission axis of the discotic film and the analyzer can be defined by the retardation characteristics of the discotic film layer.

For example, a transmissive cell with two perpendicularly crossed conventional polarizers is considered. The white point chromaticity of the cell can be corrected using the discotic film layer with the transmission axis perpendicular to the analyzer. The black point chromaticity can be corrected using the discotic film layer with the transmission axis parallel to the analyzer. Any one of the described configurations can correct the grayscale point as the white (or black) point is restored to a neutral chromaticity, for example the standard D65 white point on the CIE 1976 diagram.

With respect to the standard CIE 1976 color diagram, the present invention provides the possibility to restore the position of the white, black and gray points of the liquid crystal cell to a region of neutral chromaticity. The use of the discotic film layer polarizing in the range from 380 nm to 500 nm enables the blue shift at low gray levels and the black level to be neutralized. The use of the discotic film layer polarizing in the range from 600 run to 780 nm allows the yellow tint at high gray levels and the full-on state of the liquid crystal cell to be neutralized. These trends in liquid crystal cell coloration are typical of those found in liquid crystal cell configurations employing crossed input and output polarizers. The use of the discotic film polarizing in the wavelength ranges both from 380 to 500 nm and from 600 to 780 nm allows simultaneous correction of the yellow trend in high gray levels and the blue shift in the low gray levels. This latter case can be realized using one or two films. In the case of using two films, the first one polarizing in the range from 380 to 500 nm and the second one polarizing in the range from the 600 to the 780 nm, the transmission axes of the two films are typically oriented perpendicular to one another. The present invention can substantially neutralize the chromaticity of the black, white or gray point distorted in any direction on the color diagram.

Enhancing the color performance of liquid crystal displays at oblique viewing angles is based on the excellent angle properties of the discotic film layer. The proper choice of the discotic molecular material and the manufacturing technology provide the discotic film with high polarizing ability at oblique viewing angles.

One advantage of the present invention is the preservation of luminance throughput of the liquid crystal cell or the polarizer that is color corrected. The discotic film layer of the present invention has high photopic transmittance, i.e. the spectral light transmittance weighted by the photopic sensitivity of the eye. The addition of the discotic film layer to the polarizer or liquid crystal cell, while providing effective color correction, accomplishes this function with only a minimal decrease in photopic transmittance. The typical decrease is in the range of 3 to 5%, which is negligible for most applications.

The use of the discotic film layer is possible with any polarizer or liquid crystal cell which relies on light polarization and includes integral polarizers. The discotic film layer can be deposited directly onto either front or rear panels of a liquid crystal cell, or onto any polarizer. This is another advantage of the present invention.

In addition to the method of manufacturing the color-correcting polarizer film and/or the liquid crystal cells with the color-correcting polarizer layer, the present invention also allows preparation of the polarizer with the discotic film layer attached to it before further manufacturing steps. This approach does not require any changes to the conventional manufacturing process for liquid crystal displays.

In the design with two discotic film layers placed inside or outside of the liquid crystal cell, the discotic film with the transmission axis parallel to the analyzer provides color correction for the black state and low gray levels, and the discotic film with the transmission axis perpendicular to the analyzer provides color correction for the white state and high gray levels.

There are also some other options in case the discotic film layer is positioned inside the liquid crystal cell. Then the transmission axis can be positioned at a certain angle with respect to the analyzer. This allows the discotic film to additionally function as an optical retarder. The angle between the transmission axes of the discotic film and the analyzer will be defined by the retardation characteristics of the discotic film layer and the desired amount of compensatory optical retardation for a particular application.

In one embodiment of the present invention, the discotic film layer has an absorption peak between 380 and 500 nm. In another embodiment, the discotic film layer has an absorption peak between 600 and 780 nm. The absorption peak in one of the described regions corrects the color gamut of the polarizer layer or the liquid crystal cell.

In another embodiment of the present invention, the discotic film layer is formed from the stable lyotropic liquid crystal of the discotic dichroic dye molecules. The formation of the stable liquid crystal phase in the water solution provides the initial ordering for the dye molecules. This ordering along with the subsequent evaporation of the solvent and the orientation of the film provide the discotic film layer with the capability of light polarization. Therefore, the capability of the discotic dichroic dye to from stable lyotropic liquid crystal is preferred in the present invention in order to facilitate the manufacturing of the polarizing discotic film layer from the dichroic dye molecules.

The discotic film layer which is used for the color correcting polarizer can be an E-type polarizer. For example, the discotic film layer can be made of sulfonic derivatives of phenanthro-9',10':2,3-quinoxaline of the general structural formula:

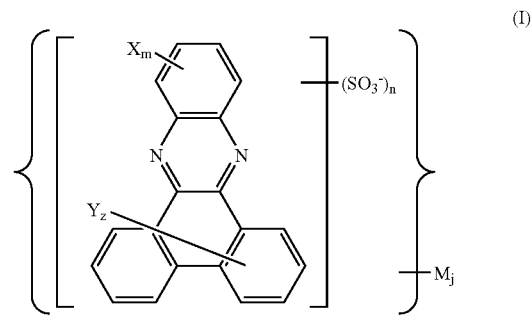

where n=1-4, m=1-4, and z=0-6 so that m+z+n≦12; X and Y=CH$_3$, C$_2$H$_5$, OCH$_3$, OC$_2$H$_5$, Cl, Br, OH, or NH$_2$; M is a counterion; and j is the number of counterions in the dye molecule, which can be fractional if the counterion is shared among several molecules (for n>1, different counterion can be involved).

The discotic film layer can also be made of a sulfonic derivative of phenanthro-9',10':2,3-quinoxaline of at least one of the structural formulas I-VIII,

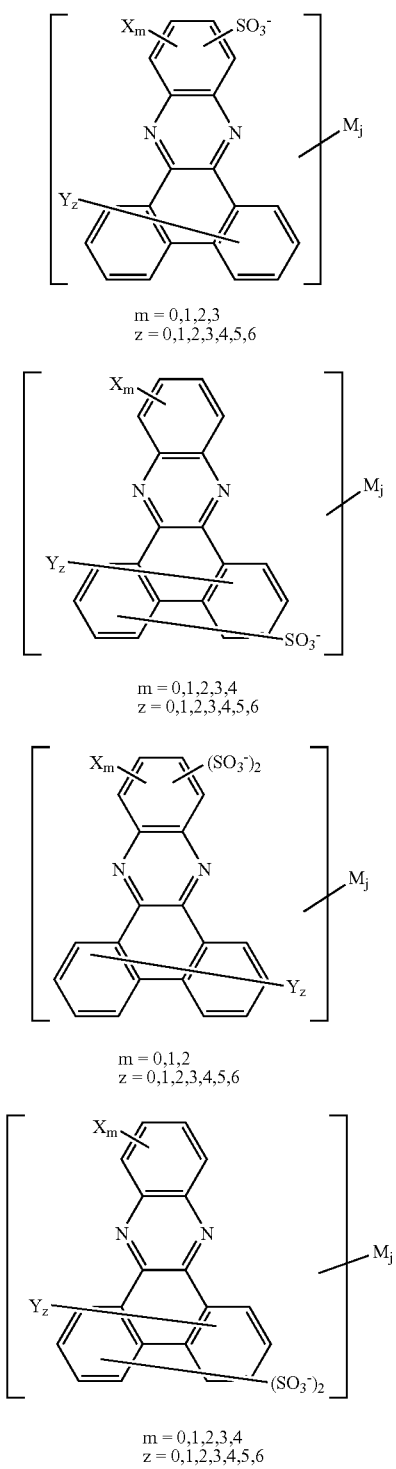

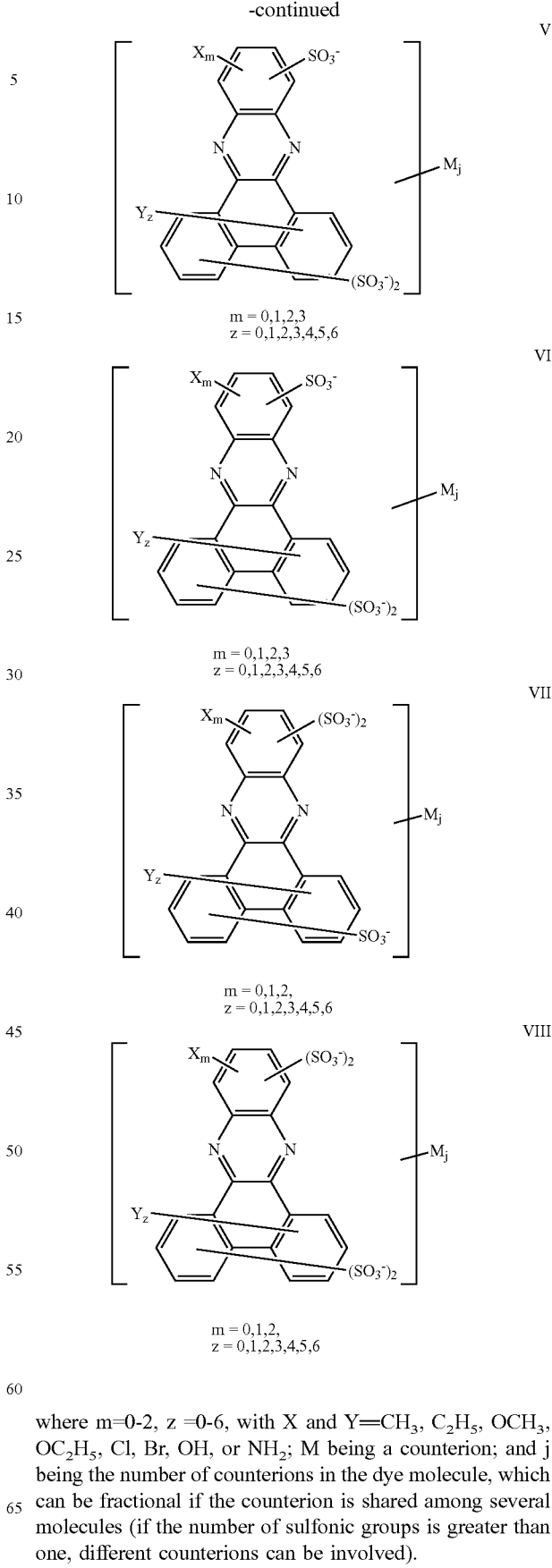

where m=0-2, z =0-6, with X and Y=CH$_3$, C$_2$H$_5$, OCH$_3$, OC$_2$H$_5$, Cl, Br, OH, or NH$_2$; M being a counterion; and j being the number of counterions in the dye molecule, which can be fractional if the counterion is shared among several molecules (if the number of sulfonic groups is greater than one, different counterions can be involved).

The polarizing film made from the above discotic molecules can work as a polarizer in the range from 380 to 500 nm. Also, the polarizing film has high transparency within the visible wavelength due to the low absorption in the range 500–780 nm. In addition, the dye molecules can form stable lyotropic liquid crystal and have dichroic properties. The dye molecules can be used for the discotic film layer of the present invention.

In another embodiment of the present invention, the discotic film layer works as an E-type polarizer. The E-type polarizer transmits the extraordinary light wave and suppresses the ordinary light wave. The discotic film polarizers are often E-type. The advantage of the E-type polarizer is the high angular characteristics and the small thickness. The combination of the pair of E-type discotic film layer and O-type polarizer layer enhances angular characteristics. The use of the E-type polarizer and the pair of E-type discotic film layer and O-type polarizer in the liquid crystal cell increases the contrast ratio at normal and oblique viewing angles, improves the viewing angle, enhances the gray scale stability and provides some other advantages depending on the type of the liquid crystal cell. In another embodiment, the liquid crystal cell has at least one O-type polarizer layer.

In the present invention, the liquid crystal cell can be designed with the use of the O-type polarizer layer. O-type polarizers can be made of iodine-based polymer polarizers. The iodine polarizers are most often used as the polarizers for liquid crystal cells and most of these polarizers have blue leakage consisting of increased transmittance of the pair of perpendicularly crossed polarizers in the short-wavelength region from 380 nm to 500 nm. The blue leakage can result in distorted color rendering at low gray levels and oblique angles and degrade the color gamut of the liquid crystal cell. The use of the discotic film layer enhances the correction of the color gamut and color rendering at low gray levels and oblique angles.

In another embodiment of the present invention, the E-type polarizer layer has negative birefringence. The liquid crystal layer in the liquid crystal cell has positive birefringence. The addition of the layer with the negative birefringence compensates the light path difference between the extraordinary and ordinary rays. The compensation enhances the contrast ratio at the oblique and normal angles, improving color rendering and viewing angles.

In another embodiment, the thin crystal film (TCF) polarizer is used as either the discotic film polarizer or the polarizer of the present invention. In addition to the advantages described above, other advantages can be obtained. For example, the possibility to modify the optical properties of the film in the course of manufacturing. This approach allows the absorption spectrum of the polarizing film to be modified so as to provide for correct color rendering and achromatism of the display. The use of the dyes as initial materials also makes it possible to use such polarizers as color or neutral optical correction filters or as UV or IR filters.

Using birefringence of the films, the polarizer can be employed as a retarder. By modifying the optical anisotropy of the films, it is possible to improve the viewing angle of the liquid crystal cells with TCF polarizers.

The alignment procedure allows the formation of a system of micro-roughnesses with a special direction on the polarizer surface, and it allows the polarizer to serve as an alignment layer for the liquid crystal layer.

The use of the thin crystal films (TCF) available from Optiva, Inc. increases the viewing angle, improves the contrast and luminance characteristics, simplifies the fabrication process, reduces the cost of liquid crystal display production, and expands the liquid crystal cell working temperature range.

The TCF polarizer can be used as the discotic film polarizer that works as a polarizer in all visible wavelength range and has the spectrum that is optimized for the particular liquid crystal cell in order to correct the black or white or any grayscale states of the liquid crystal cell.

At least one adhesive layer and at least one substrate can be added to the color correcting polarizer film. The purpose of the substrate layers is to enhance the mechanical stability of the film. Also the substrate layer can be used as a layer of the color-corrected device, for example the liquid crystal cell. The adhesive material can be fixed to the color-correcting film or the polarizer of the liquid crystal cell.

In another embodiment of the present invention, the substrate is birefringent. The birefringence of the substrate facilitates the additional functions of the color correcting film. For example, the birefringent quality of the substrate can serve as an additional anti-glare layer of the color correcting film. In the case that polyethylene terephthalate (PET) is used as the material for the substrate, the thermal stability of the color correcting film is improved.

In another embodiment of the present invention, the color correcting polarizer film comprises at least one additional protective layer. The protective layer can increase the scratch resistance, mechanical stability, and the moisture resistance.

The color correcting polarizer film can also comprise an additional antireflective or an additional antiglare or antiblazing layer. The purpose of the antiglare or antireflective layers is to suppress the glare of reflected light, respectively, when the color correcting polarizing film is used in the liquid crystal cell.

In another embodiment of the present invention, the liquid crystal cell comprises an additional reflective layer. The reflective layer is required for reflective liquid crystal cells. The reflective liquid crystal cells are capable of working with incident ambient light without the need of integral lighting system, and the power consumption of the reflective cells is low. The reflective liquid crystal cell has small thickness, which can reduce switching time, and provide high multiplexing rates and low color dispersion.

In another embodiment of the present invention, the liquid crystal cell has a reflective layer and at least part of the reflective layer possesses specular reflective properties. The specular reflection provides the liquid crystal cell with high brightness due to the absence of the light intensity losses resulting from the diffusive scattering of the light. In another embodiment, the liquid crystal cell has a reflective layer and at least part of the reflective layer possess diffusive reflective properties. The diffusive reflection of the reflective layer expands the effective viewing cone of the reflective liquid crystal display and may also suppress interference effects in the plurality of liquid crystal cell layers. In another embodiment, the liquid crystal cell has a reflective layer and at least part of the reflective layer is transmissive (the transflective layer). The transflective layer means the reflective layer partially transmits light from an integral backlight source. The use the transflective layer can provide a liquid crystal cell that combines the properties of reflective and transmissive cells in one unit.

In the present invention the discotic film layer in the liquid crystal cell can also operate as a retarder, or a color filter, or a combination of at least two of the named functions. Besides the correction of color rendering for the color filter or enhancement of the contrast ratio for the retarder, the combination of the functions reduces the thickness of the cell, which in turn improves angle characteristics and simplifies the design of the liquid crystal cell.

The discotic film layer in the liquid crystal cell can be applied onto the polarizer inside the cell. The placement of the polarizer layer inside the cell, or between the transparent substrates of the liquid crystal cell provides additional protection for the polarizer layer from atmospheric moisture and mechanical damage, and reduces cell thickness. Small cell thickness provides improved angular characteristics.

The present invention will now be described with reference to the accompanying drawings.

FIG. 1 shows a transmission spectrum of a pair of typical iodine-polarizers with transmission axes crossed at 90°. The axis 101 represents the wavelength, and the axis 102 represents transmission. The plot demonstrates the typical drawback of the conventional polarizers pertaining to the spectral leakage in the blue-violet region from 350 to 530 nm. The leakage in the red region, despite the substantially high value, is not so important in the liquid crystal display application. This is due to the relatively low radiant intensity of most backlighting systems in the red region, and the very low photopic sensitivity of the human eye in the wavelength region higher than 680 nm. Therefore, the white point on the colorimetric diagram of the typical display involving a pair of such conventional polarizers undergoes a progressive shift toward the blue region from a desired achromatic standard as the gray level decreases and approaches the black level.

Figure 2:
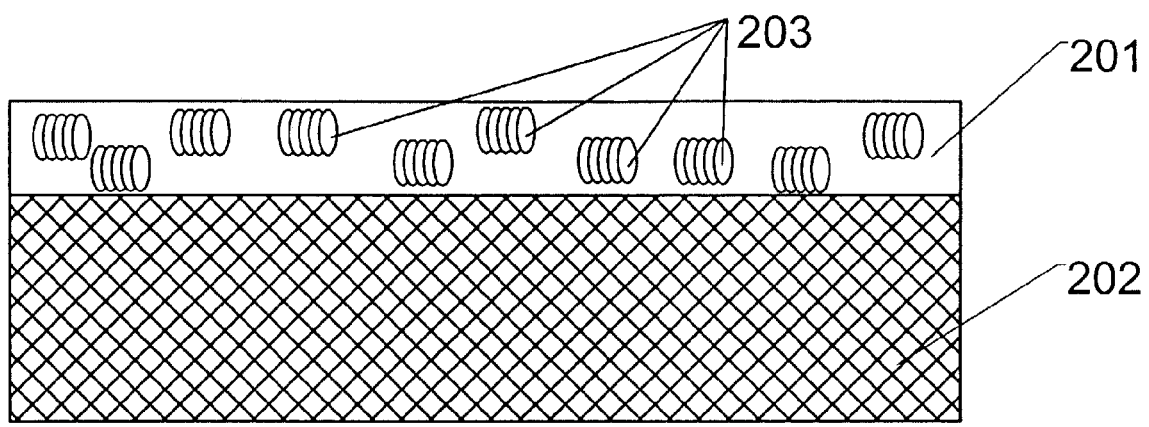
FIG. 2 is a schematic showing a basic design of the color correcting polarizer film that includes a polarizer and a color correcting discotic film according to one embodiment of the present invention.

FIG. 2 show a basic design of the color correcting polarizer according to one embodiment of the invention. The color correcting polarizer comprises a polarizer layer 202 and a discotic film layer 201. The discotic film layer is made of discotic molecules 203. The discotic film layer also works as a polarizer which may be spectrally selective and birefringent. While the basic design shown in FIG. 2 comprises only two layers, other layers can also be included to enhance the functionality of the color correcting polarizer.

Figure 3:
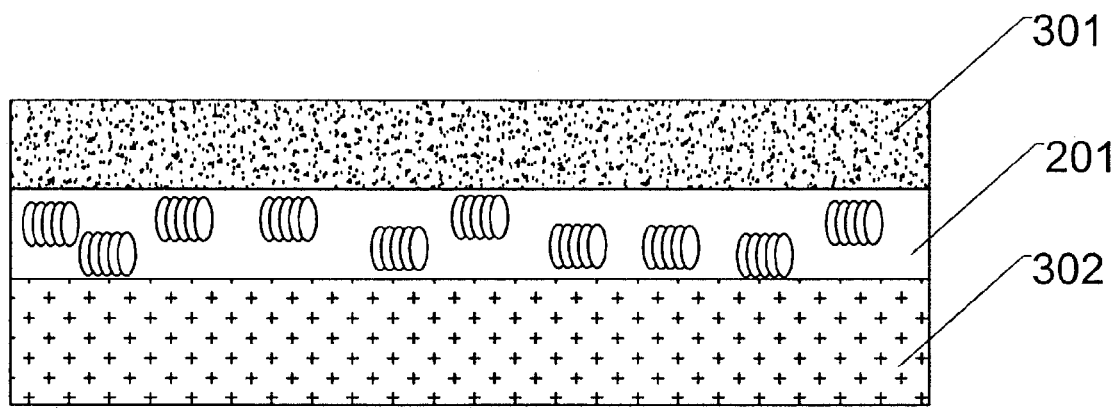
FIG. 3 is a schematic showing a color correcting polarizer comprising a discotic film layer, an adhesive layer placed on the discotic film layer, and a substrate layer according to one embodiment of the present invention.

FIG. 3 shows a design comprising a discotic film layer (201), an adhesive layer 301 and a substrate layer 302, wherein the adhesive layer 301 is placed atop the discotic film layer 201. This design shows a possible application of the present invention. The adhesive layer 301 is introduced in order to fix the discotic film layer 201 to a polarizer, or any surface of the liquid crystal cell. The discotic film layer 201 and adhesive layer 301 are deposited subsequently on the substrate layer 302. A substrate layer may be required for the alignment of the discotic film layer as the mechanical base. The substrate layer 302 can be either birefringent or non-birefringent. For example, the substrate can be made of polyethylene terephthalate (PET), TAC and PMMA.

Figure 4:
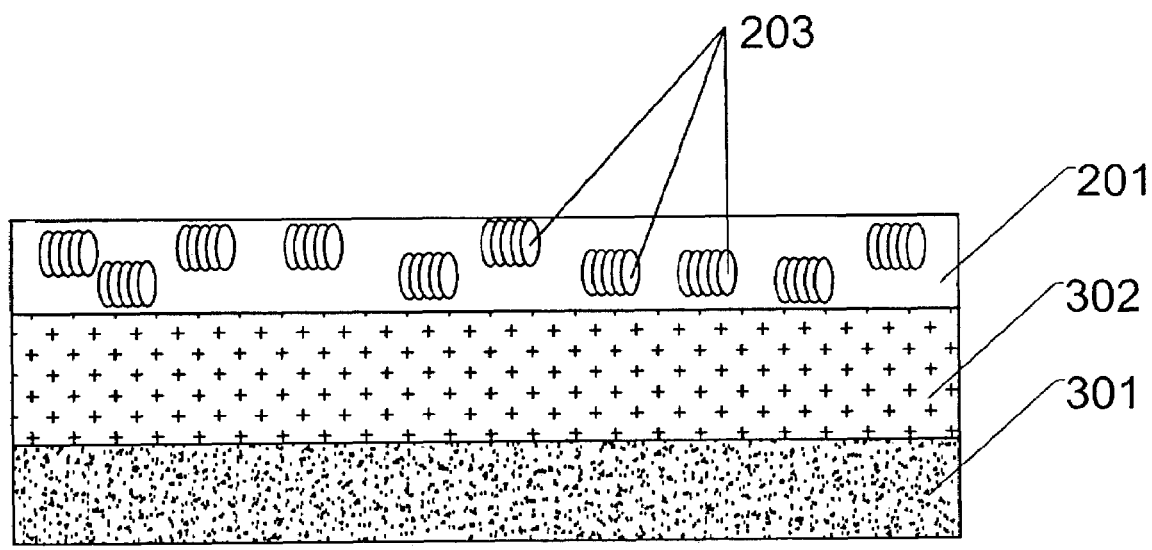
FIG. 4 is a schematic showing a color correcting polarizer comprising a discotic film layer, a substrate layer, and an adhesive layer placed onto the substrate layer according to one embodiment of the present invention.

FIG. 4 shows a design comprising a discotic film layer 201, an adhesive layer 301 and a substrate layer 302, wherein the adhesive layer (301) is placed onto the substrate layer 302. The position of the adhesive layer 301 makes this design different from the one presented in FIG. 3. The substrate 302 in FIG. 4 can be non-birefringent.

FIGS. 3 and 4 illustrate one of the applications of the present invention. The plurality of layers with adhesive layer 301 placed on the side can be fixed on any other surfaces by the adhesive layer. Therefore, the discotic film layer 201 supported by the substrate 302 and equipped with the adhesive layer 301 can be used for color correction of any liquid crystal cell or polarizer.

Figure 5:
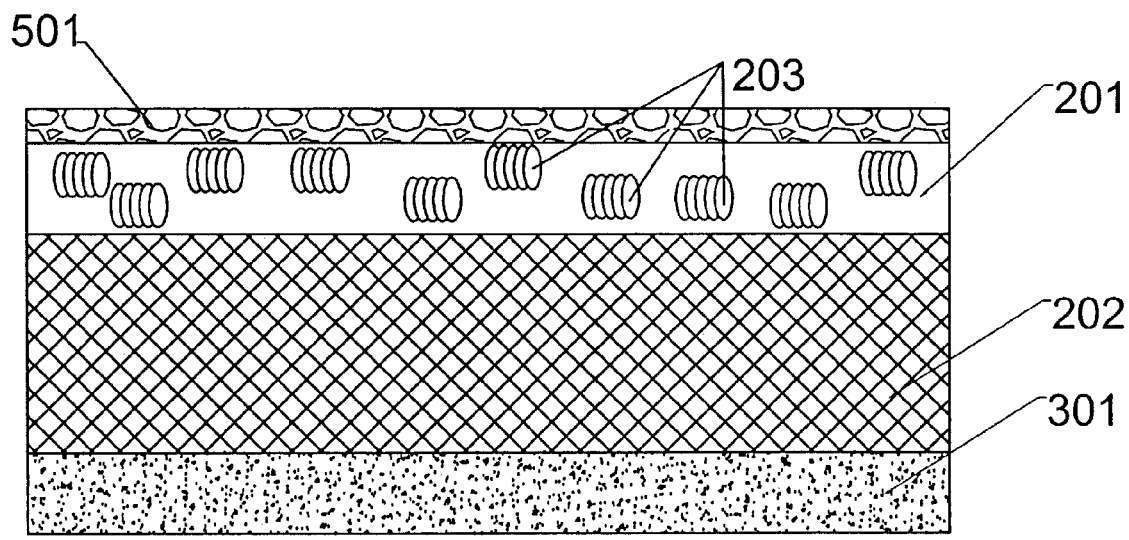
FIG. 5 is a schematic showing a color correcting polarizer comprising an antiglare (or antiblazing) coating on a discotic film layer according to one embodiment of the present invention.

FIG. 5 shows a design comprising a discotic film layer 201 with an antiglare or antiblazing coating 501 deposited onto the discotic film layer 201. The antiglare or antiblazing coating 501 is used in the liquid crystal displays to improve the contrast ratio and brightness of the cell working under ambient light.

Figure 6:
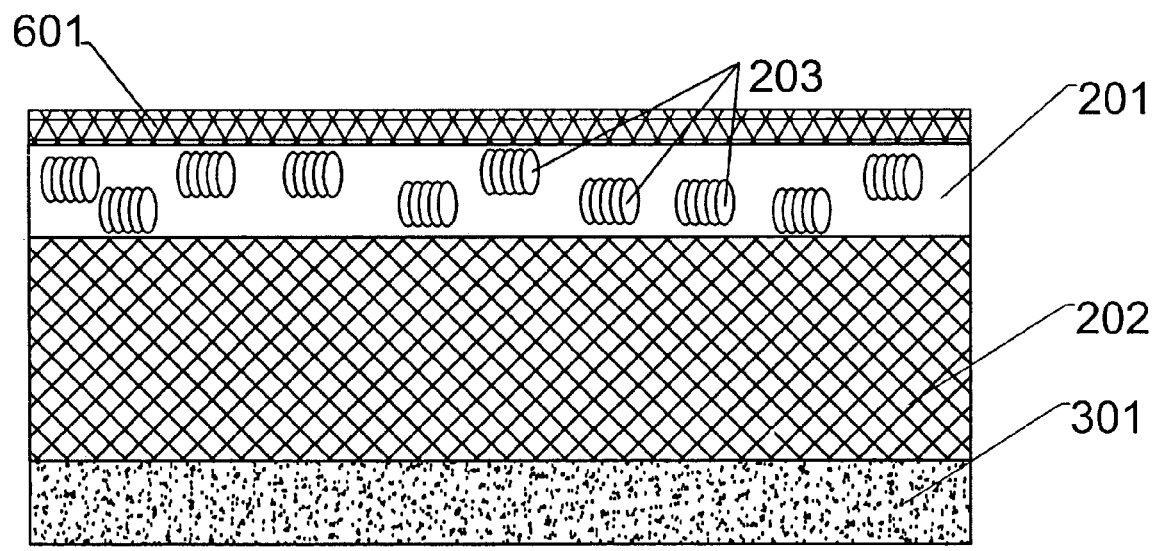
FIG. 6 is a schematic showing a color correcting polarizer comprising a protective layer atop a discotic film layer according to one embodiment of the present invention.

FIG. 6 shows a design comprising a discotic film layer 201 with a protective layer 601 placed onto the discotic film layer 201. The protective layer 601 can be placed onto the discotic film layer or it can be further placed onto any layer deposited onto the discotic film layer. The protective film layer 601 provides protection from the atmospheric moisture, mechanical damage, and enhances the scratch resistance.

EXAMPLE 1

Figure 7:
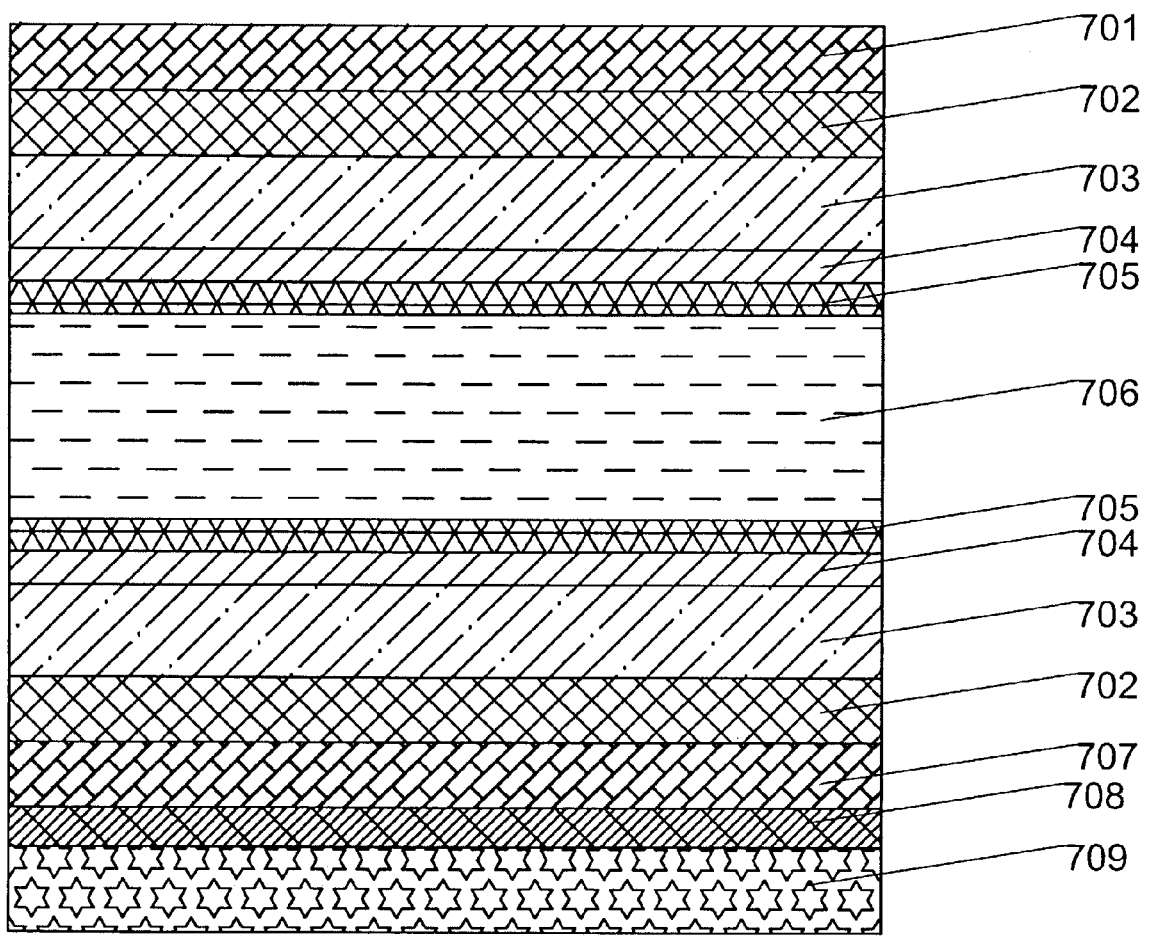
FIG. 7 is a schematic of one reference example of a color liquid crystal display design without the color correcting polarizer of the present invention.
Figure 8:
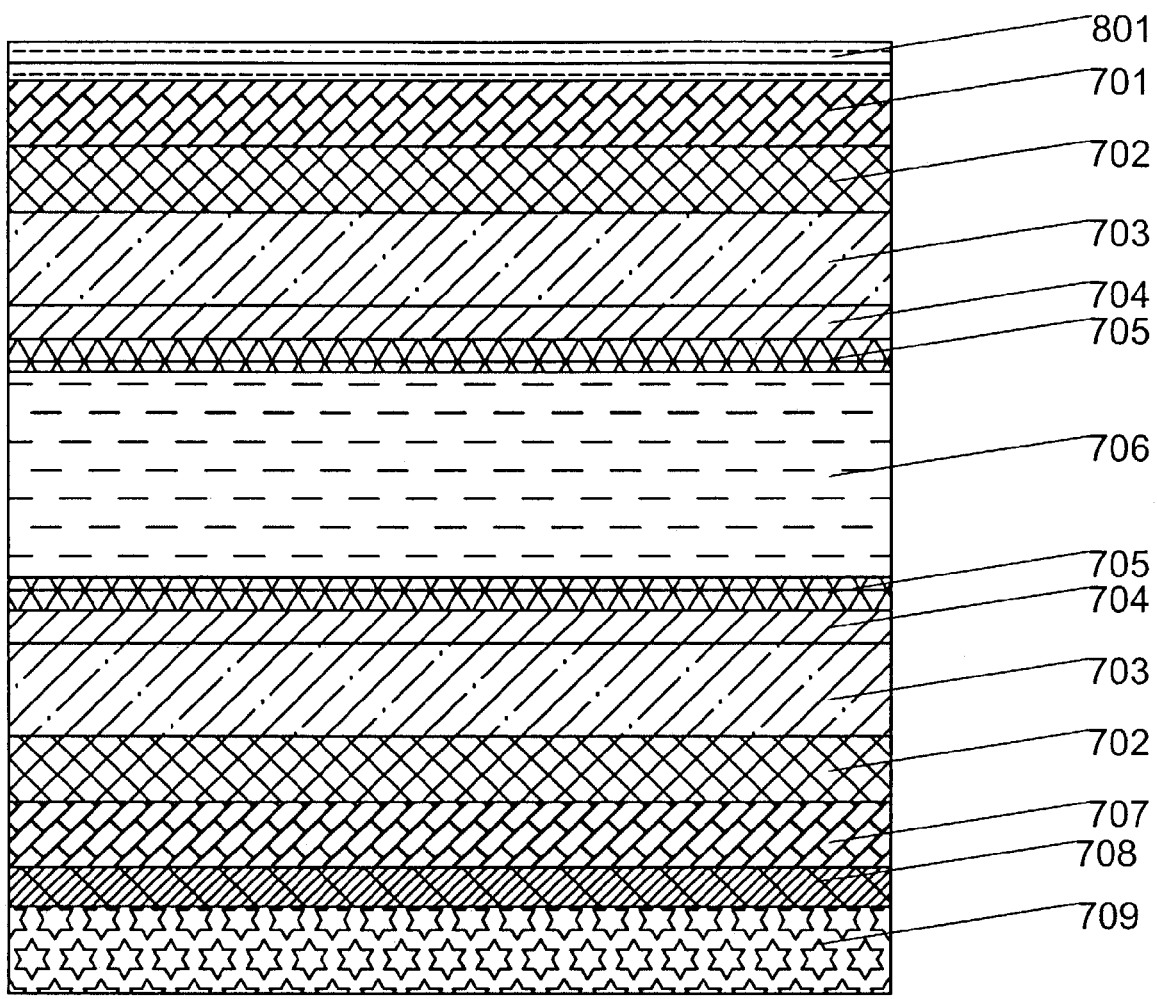
FIG. 8 is a schematic of one example of a color liquid crystal display design with one embodiment of the color correcting polarizer of the present invention.

The technical advantages provided by the present invention were investigated using two active-matrix liquid crystal displays. The first display as shown in FIG. 7 was not color corrected and taken as reference point for comparison. The second display as shown in FIG. 8 was color corrected to demonstrate the results obtained by the present invention. FIGS. 9 to 12 show the obtained results.

FIG. 7 shows the structure of the reference liquid crystal display without the color correcting polarizer of the present invention. The basic design parameters of this configuration are as follows: (1) high-efficiency Nitto G-1224-DU sheet polarizers (701, 707) with transmission axes aligned at 45° at the rear of the liquid crystal cell (707) and at −45° at the front analyzer (701) location; (2) a 90° clockwise twist in the liquid crystal layer (706) from −45° at the rear substrate to −135° degrees at the front substrate, such that the alignment of the rubbing directions in combination with the polarizer orientations constitute a normally-white (NW) O-mode alignment; (3) Fuji Film discotic compensation films with TAC substrates (702) located between the liquid crystal layer (706) and polarizer at both the rear (707) and front (701) of the cell and aligned along the liquid layer rubbing directions; (4) MLC-12000-000 liquid crystal material (706) with $k_{11}=9.3e^{-12}$, $k_{22}=5.8e^{-12}$, $k_{33}=15.9e^{-12}$, $\epsilon_{\parallel}=12.95$, $\epsilon_{\perp}=3.55$, $n_o$@550 nm=1.4762, and $n_e$@550 nm=1.5639; (5) a cell gap of 4.5 µm, 2° pre-tilt angle and a thickness-to-pitch ratio (d/p) of 0.0495; (6) liquid crystal drive voltages of 0V in the field-off state and 5.0V in the field-on state; (7) 800A ITO transparent electrode (704) materials and 400A polyamide alignment layers (705) at the liquid crystal layer boundaries; (8) 1.1 mm Corning #1737 glass substrates (703); (9) a set of Topan RGB color filters at 1.6 µm thickness (708); and (10) a Landmark tri-band RGB fluorescent backlight spectrum for the illumination source (709).

FIG. 8 shows the structure of the modeled liquid crystal display used for the demonstration of the technical benefits produced by the present invention. As compared to the reference liquid crystal display shown in FIG. 7, the liquid crystal display shown in FIG. 8 further comprised a discotic film layer 801. The discotic film layer 801 was placed onto the front surface of the analyzer (701) in order to correct the color characteristics of the display.

Figure 9:
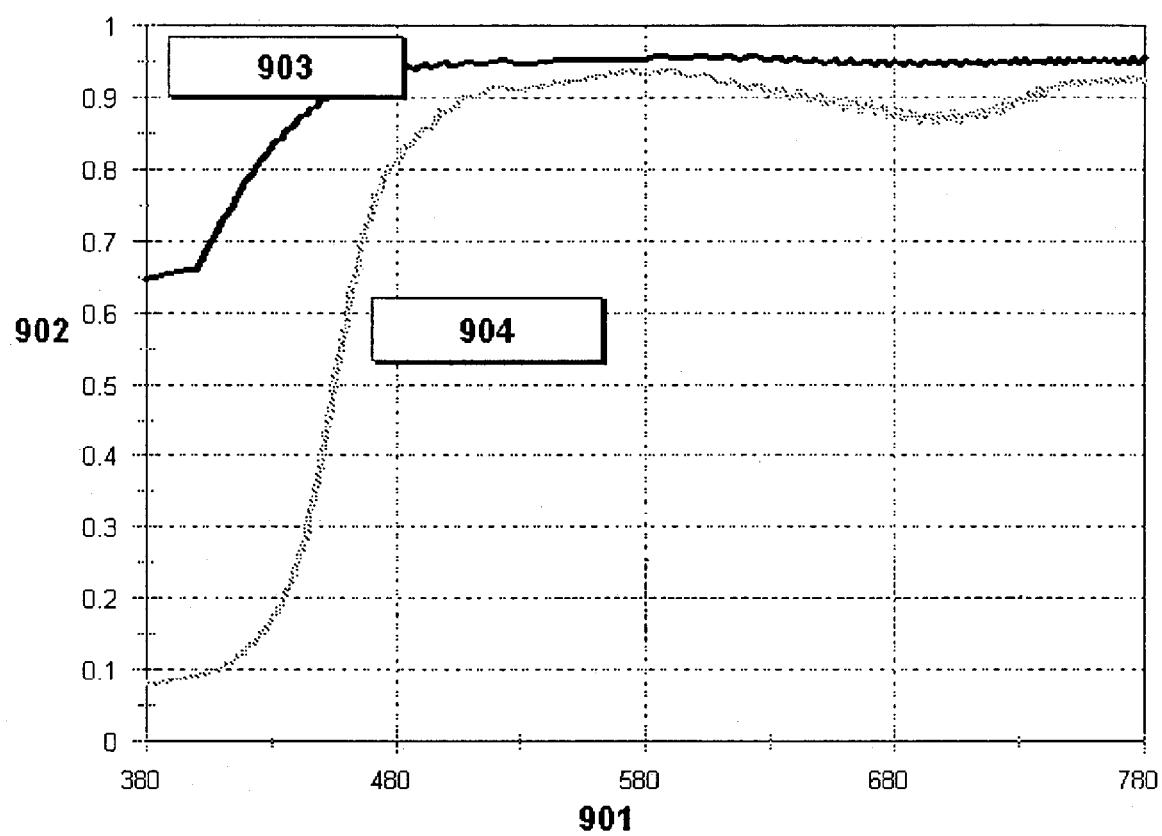
FIG. 9 is a sample transmission spectrum of a discotic film for polarized light oriented both perpendicular and parallel to the transmission axis of the film.

FIG. 9 shows the transmission spectrum of the discotic color-correction film for polarized light oriented both perpendicular and parallel to the transmission axis of the film. The X-axis 901 represents the wavelength in nanometers, and the Y-axis 902 represents the transmittance of the discotic film. The transmission spectrum for polarized light oriented parallel to the transmission axis of the discotic film is represented by curve 903, and the transmission spectrum for polarized light oriented perpendicular to the transmission axis of the discotic film is represented by curve 904. FIG. 9 shows the ability of the discotic film of the invention to polarize light in the region from 380 to 500 nm. FIG. 9 also shows high transmittance of the film in the region from 500 nm to 780 nm. This is evidence of high photopic transmittance of the discotic film of the present invention.

Figure 10A:
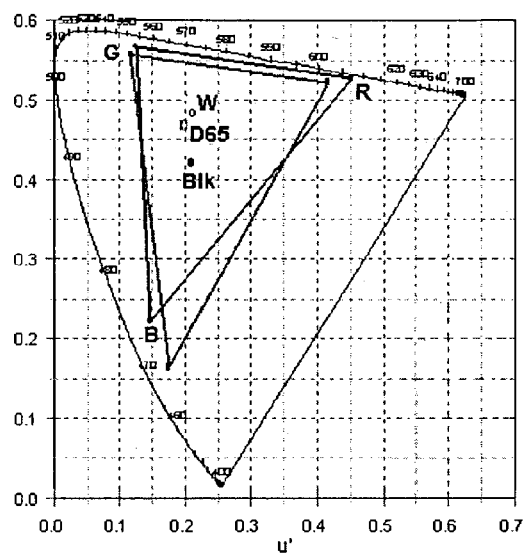
FIG. 10A is the CIE 1976 diagram for the reference example color liquid crystal display as shown in FIG. 7 without the color correcting polarizer of the present invention.
Figure 10B:
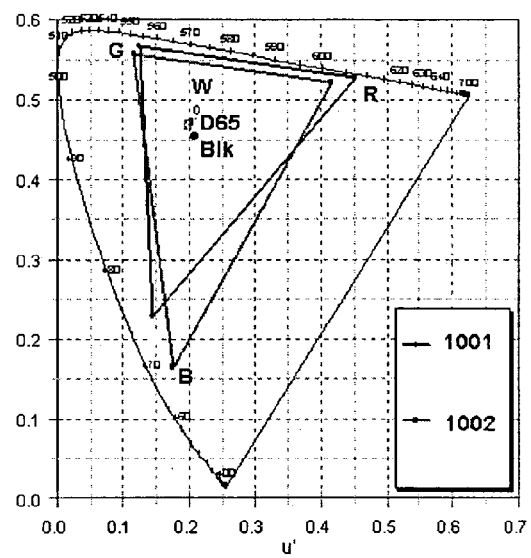
FIG. 10B is the CIE 1976 diagram for the color liquid crystal display as shown in FIG. 8 with the color correcting polarizer of the present invention.

FIG. 10A shows the CIE 1976 diagram for the liquid crystal display without the color correcting polarizer of the invention as shown in FIG. 7. FIG. 10B shows the CIE 1976 diagram for the liquid crystal display with the color correcting polarizer of the invention as shown in FIG. 8. FIG. 10A depicts the position of the black (Blk) and white (W) points of the reference liquid crystal display on the colorimetric diagram. The point marked D65 provides a reference chromaticity for CIE standard white illuminant D65. The black point is obtained for the off-state of the liquid crystal cell, and the white point is obtained for the on-state. FIG. 10B depicts the position of the black and white point of the liquid crystal display of the invention on the calorimetric diagram. The triangular boundary regions demarcate the color gamut boundaries of the liquid crystal displays (1001) and a reference color CRT using P22 phosphor primaries 1002). The liquid crystal display with the color-correction polarizing layer (FIG. 10B) has the black and the white points placed closer to each other and both of these points are closer to the standard D65 white point. This indicates effective color correction performance, especially the neutralization of the blue-shifted black point (Blk) when comparing their chromaticity coordinates relative to the D65 white point in FIGS. 10A and 10B.

Figure 11:
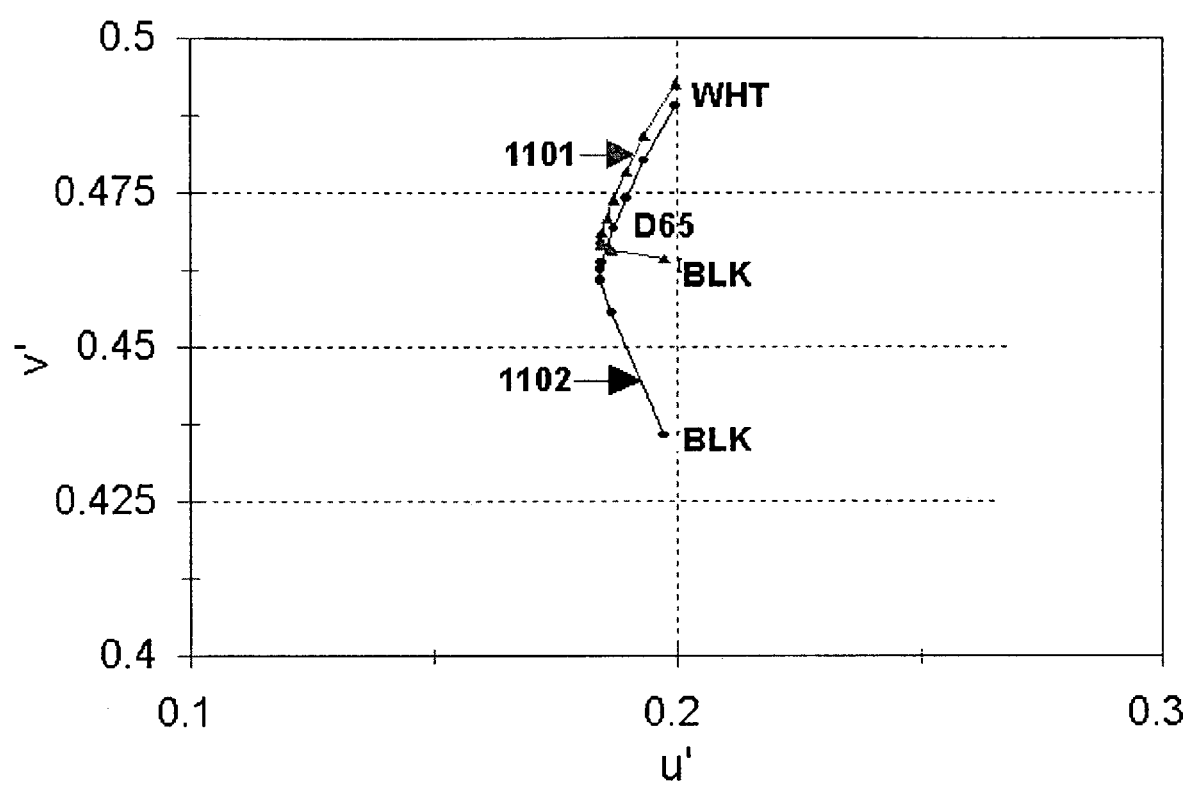
FIG. 11 is a data plot illustrating the neutral point chromaticity shift for the reference and color-corrected color liquid crystal displays on the CIE 1976 diagram.

FIG. 11 displays the neutral point chromaticity shift on the CIE 1976 diagram for the reference and color-corrected display configurations. Curve 1102 is obtained for the reference display and curve 1101 is for the color-corrected display. FIG. 11 demonstrates the impact of the discotic film polarizer on color tracking performance across the range of display intensity levels. The inventors determined the applied LC voltage required to produce photopic gray levels at the following percentages relative to the peak white photopic luminance (0 volts): 80%, 60%, 40%, 20%, 10%, 5%, 1%, 0.5% and black (5 volts). The chromaticity coordinates of the white point were then computed at each of these photopic gray levels. The resulting plot, shown in FIG. 11, illustrates the variations in chromaticity of the white point (i.e. color tracking error) across the full intensity range of the AMLCD in both reference and color-corrected configurations. It is apparent that chromaticity variations of the display neutral point across the range of display intensity levels are substantially reduced for the color-corrected display (1101) relative to the uncorrected reference display (1102).

Figure 12:
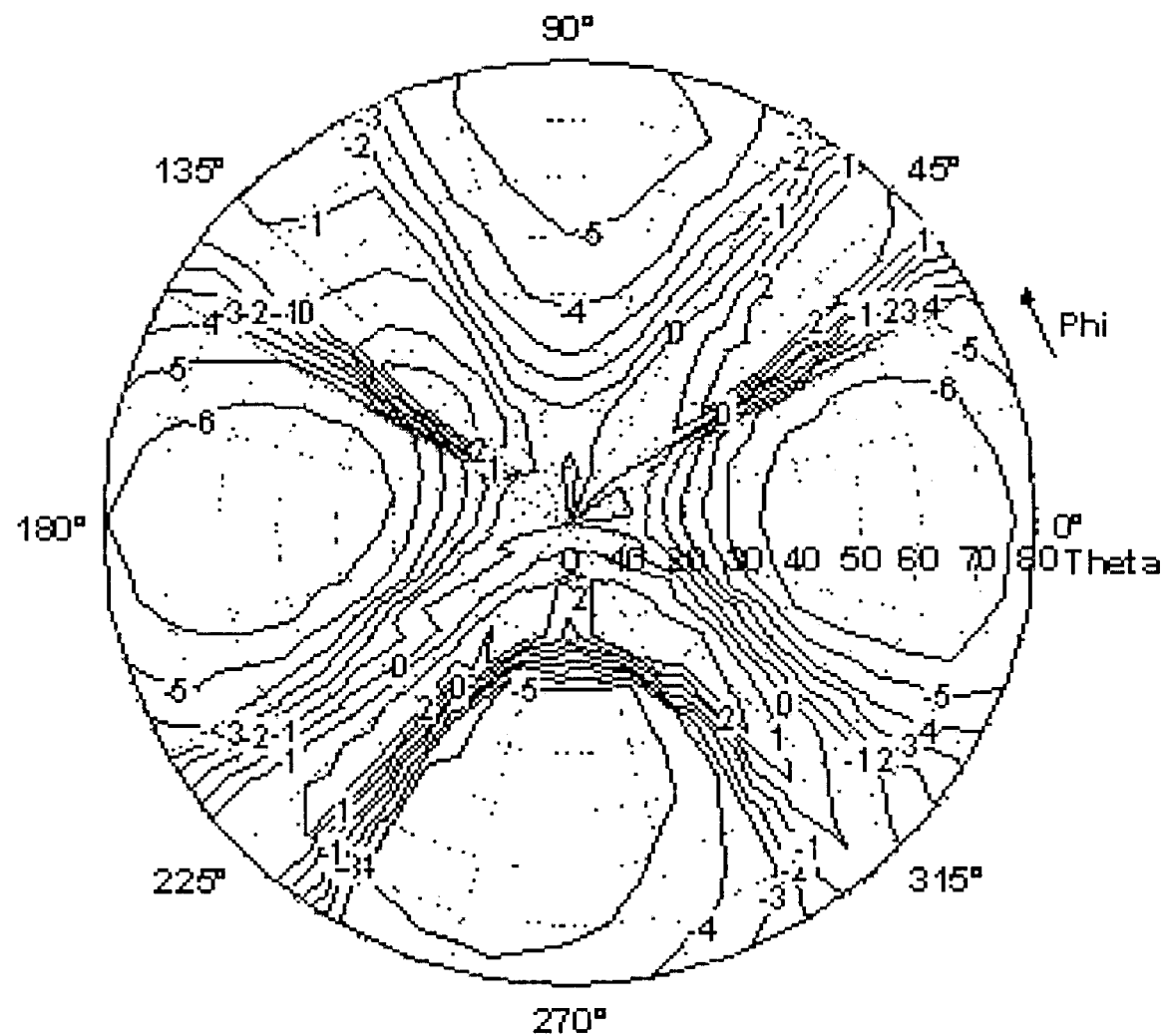
FIG. 12 is an iso-chromaticity-difference contour plot showing the differences in angular chromaticity change between reference and color-corrected color liquid crystal displays expressed in chromaticity JNDs.

FIG. 12 show cross configuration difference contours for angular chromaticity change of the display black state expressed in chromaticity JNDs. Since it is difficult to visually evaluate the reductions in viewing-angle dependent color variations from two separate iso-color difference plots, a plot of the color difference contours resulting from a difference of the Δu'v' values between color-corrected and reference configurations at each angle was generated. Recent standards of display metrology have specified that a Δu'v'=0.004 constitutes a just-noticeable-difference (JND) in chromaticity for most observers. To express the cross configuration difference more directly in units of perceptible chromaticity differences, the contours have been re-scaled to units of chromaticity JNDs. Negative values for the contours indicate angular regions where the color-corrected configuration has reduced the color variation relative to the same angular positions in the baseline configuration. Positive contour values are indicative of angular regions where the reference configuration provides less angular color variation. It can be clearly observed from FIG. 12 that the contours are negative almost everywhere except along the main diagonal where they tend toward zero. The pronounced reductions in color variation occurring along the horizontal and vertical axes noted above are clearly evident in this difference-of-contours plot. This final plot is expressed in units which estimate the perceptual relevance of these chromaticity differences to an observer.

The present color-correcting polarizer film can be used for color corrections of liquid crystal displays in direct-view transmissive and reflective modes as well as for projection system applications. The present invention can find applications for different types of liquid crystal displays, including twist nematic and supertwist nematic liquid crystal displays, as well as for different types of TFT displays such as those based on vertical-alignment and in-plane switching technologies.

As described above, a color-correcting polarizer has been described. The foregoing descriptions of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

What is claimed is:

1. A color correcting polarizer comprising:
    a polarizer layer; and at least one discotic film layer,
    wherein the polarizer layer is an O-type polarizer, and
    the discotic film layer is optically transparent within the range of visible wavelength, and works as a polarizer in the wavelength range at least from 380 to 500 nm,
    wherein the discotic film layer is formed from a lyotropic liquid crystal based on discotic dichroic dye molecules, and
    the discotic film layer is made of the sulfonic derivatives of phenanthro-9', 10':2,3 quinoxaline of the general structural formula

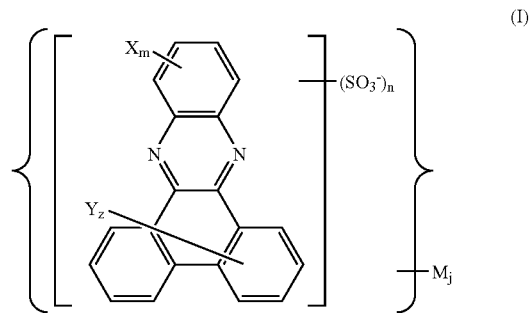

(I)

where n=1-4, m=1-4, and z=0-6 so that m+z+n≦12; X and Y=CH$_3$C$_2$H$_5$, OCH$_3$, OC$_2$H$_5$, Cl, Br, OH, or NH$_2$; M is a counterion; and j is the number of counterions in the dye molecule, which can be fractional if the counterion is shared among several molecules, and for n>1, different counterion can be involved.

2. The color correcting polarizer according to claim 1, wherein the polarizer layer and the at least, one discotic film layer have parallel or perpendicular transmission axes.

3. The color correcting polarizer according to claim 1, wherein the discotic film layer works as an E-type polarizer.

4. The color correcting polarizer according to claim 3, wherein the E-type polarizer layer has negative birefringence.

5. The color correcting polarizer according to claim 1, wherein the discotic film layer is a thin crystal film polarizer.

6. The color correcting polarizer according to claim 1, wherein the polarizer layer is a thin crystal film polarizer.

7. The color correcting polarizer according to claim 1 further comprises at least one layer of an adhesive material and at least one substrate.

8. The color correcting polarizer according to claim 7, wherein the substrate is birefringent.

9. The color correcting polarizer according to claim 7, wherein the substrate is non-birefringent.

10. The color correcting polarizer according to claim 1, further comprises a protective layer.

11. The color correcting polarizer according to claim 1, further comprises an antireflective layer.

12. The color correcting polarizer according to claim 1, further comprises an antiglare layer.

13. A liquid crystal cell comprising:
a front panel;
a rear panel;
liquid crystal layer placed between the front and rear panels; and a color correcting polarizer, wherein
the color correcting polarizer comprises at least one polarizer layer and at least one discotic film layer, wherein the at least one polarizer layer is an O-type polarizer and the at least one dicotic film layer is optically layer is 0-type polarizer and said discotic film layer is optically transparent within the range of visible wavelength and works as a polarizer in the wavelength range at least from 380 to 500 nm,
wherein the at least one discotic film layer is formed from a lyotropic liquid crystal based on discotic from a lyotropic liquid crystal based on discotic dichroic dye molecules, and
is made of the sulfonic derivatives of phenathro-9', 10': 2,3-quinoxaline of the general structural formula

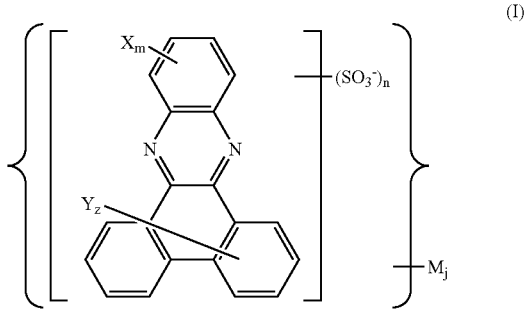

where n=1-4, m=1-4, and z=0-6 so that m+z+n≦12; X and Y=CH$_3$C2H$_5$, OCH$_8$, OC$_2$H$_5$, Cl, Br, OH, or NH$_2$; M is a counterion; and j is the number of counterions in the dye molecule, which can be fractional if the counterion is shared among several molecules, and for n>1, different counterions can be involved.

14. The liquid crystal cell according to claim 13, wherein the at least one polarizer layer and the at least one discotic film layer have parallel or perpendicular transmission axes.

15. The liquid crystal cell according to claim 13, wherein the at least one discotic film layer is also a polarizer in the visible wavelength range.

16. The liquid crystal cell according to claim 15, wherein the at least one discotic film layer has the predetermined transmission spectrum which is a combination of spectra of a neutral polarizer and a color correcting polarizer.

17. The liquid crystal cell according to claim 13, wherein the O-type polarizer is an iodine-based polymer polarizer.

18. The liquid cell according to claim 13, wherein the color correcting polarizer further comprises at least one polarizer layer which is an E-type polarizer.

19. The liquid crystal cell according to claim 18, wherein the E-type polarizer is formed from a lyotropic crystal based on discotic dichroic dye molecules.

20. The liquid crystal cell according to claim 13, wherein the at least one discotic film layer works as an E-type polarizer.

21. The liquid crystal cell according to claim 20, wherein the E-type polarizer layer has negative birefringence.

22. The liquid crystal cell according to claim 13, wherein the at least one discotic film layer is a thin crystal film polarizer.

23. The liquid crystal cell according to claim 13, wherein the at least one polarizer layer is a thin crystal film.

24. The liquid crystal cell according to claim 13, further comprises an antiglare or antireflection coating placed onto an outer surface of the liquid crystal cell.

25. The liquid crystal cell according to claim 13, further comprises a reflective layer.

26. The liquid crystal cell according to claim 25, wherein at least part of the reflective layer possesses specular reflective properties.

27. The liquid crystal cell according to claim 25, wherein at least part of the reflective layer possesses diffusive reflective properties.

28. The liquid crystal cell according to claim 25, wherein at least part of the reflective layer is transmissive.

29. The liquid crystal cell according to claim 13, wherein the at least one discotic film layer functions as a retarder, a color filter, or a combination thereof.

30. The liquid crystal cell according to claim 13, wherein the discotic film layer is applied onto the polarizer on a side proximate to the liquid crystal layer.

31. A color correcting polarizer comprising:
a polarizer layer; and at least one discotic film layer, wherein the polarizer layer is O-type polarizer, and
the at least one discotic film layer is optionally transparent within the range of visible wavelength, and works as a polarizer in the wavelength range at least from 380 to 500 nm
the discotic film layer is formed from a lyotropic liquid crystal based on discotic dichroic dye molecules, and
is made of a sulfonic derivative of phenanthro-9', 10':2, 3-quinoxaline of at least one of the structural formulas I–VII:

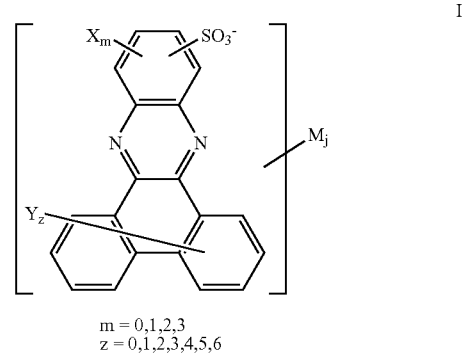

-continued

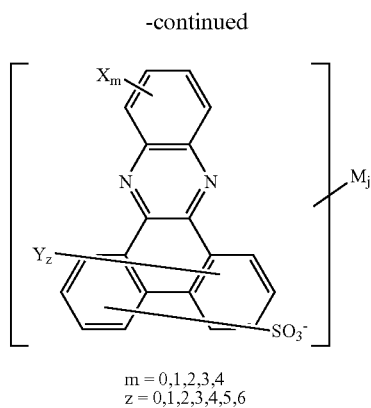

m = 0,1,2,3,4
z = 0,1,2,3,4,5,6

II

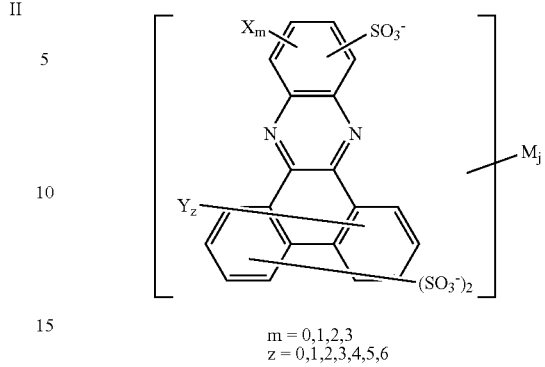

m = 0,1,2,3
z = 0,1,2,3,4,5,6

VI

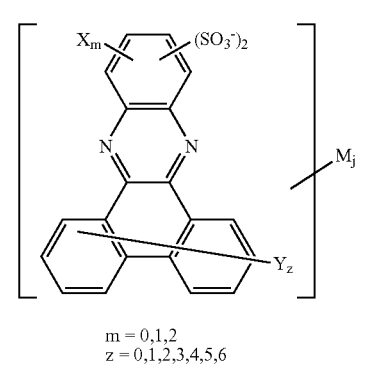

m = 0,1,2
z = 0,1,2,3,4,5,6

III

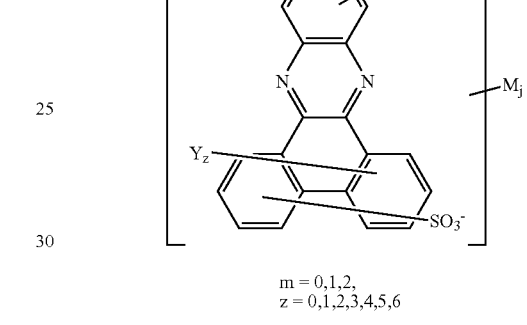

m = 0,1,2,
z = 0,1,2,3,4,5,6

VII

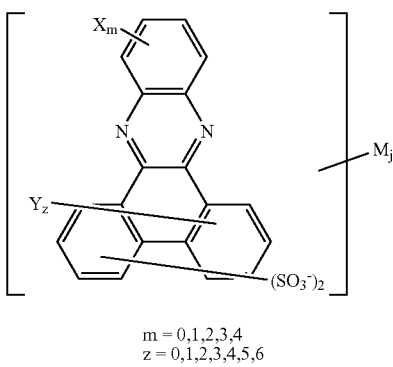

m = 0,1,2,3,4
z = 0,1,2,3,4,5,6

IV

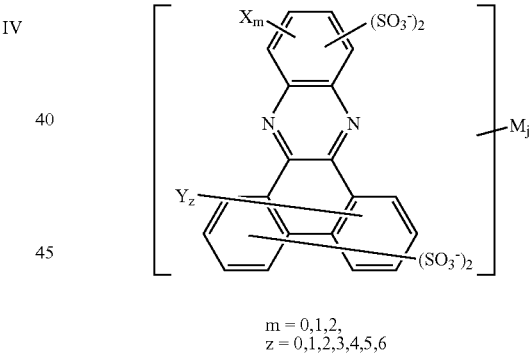

m = 0,1,2,
z = 0,1,2,3,4,5,6

VIII

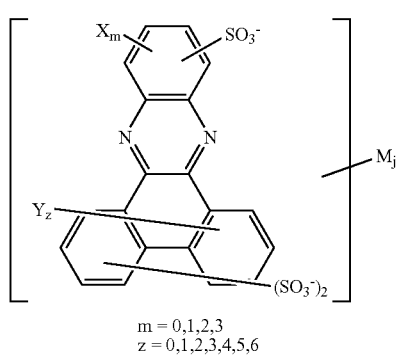

m = 0,1,2,3
z = 0,1,2,3,4,5,6

V where m=0-2, z=0-6, with X and Y=$CH_3$, $C_2H_6$, $OCH_3$, $OC_2H_5$, Cl, Br, OH, or $NH_2$; M being a counterion; and j being the number of counterions in the dye molecule, which can be fractional if the counterion is shared among several molecules, and if the number of sulfonic groups is greater than one, different counterions can be involved.

32. The color correcting polarizer according to claim 31, wherein the polarizer layer and the at least one discotic film layer have parallel or perpendicular transmission axes.

33. The color correcting polarizer according to claim 31, wherein the at least one discotic film layer works as an E-type polarizer.

34. The color correcting polarizer according to claim 33, wherein the E-type polarizer layer has negative birefringence.

35. The color correcting polarizer according to claim 31, wherein the at least one discotic film layer is a thin crystal film polarizer.

36. The color correcting polarizer according to claim 31, wherein the polarizer layer is a thin crystal film polarizer.

37. The color correcting polarizer according to claim 31, further comprises at least one layer of an adhesive material and at least one substrate.

38. The color correcting polarizer according to claim 37, wherein the substrate is birefringent.

39. The color correcting polarizer according to claim 37, wherein the substrate is birefringent.

40. The color correcting polarizer according to claim 31, further comprises a protective layer.

41. The color correcting polarizer according to claim 31, further comprises an antireflective layer.

42. The color correcting polarizer according to claim 31, further comprises an antiglare layer.

43. A liquid crystal cell comprising:
   a front panel;
   a rear panel;
   liquid crystal placed between the front and rear panels; and a color correcting polarizer; wherein
   the color correcting polarizer comprises at least one polarizer layer and at least one discotic film layer, the at least one polarizer layer is an O-type polarizer and the at least one discotic film layer is optionally transparent within the visible wavelength range and works as a polarizer in the wavelength range of at least from 380–500 nm,
   wherein the discotic film layer is formed from a lyotropic liquid crystal based on discotic dichroic dye molecules, and
   is made of a sulfonic derivative of pehnanthro-9', 10':2, 3-quinoxaline of a least one of the structural formulas I–VIII:

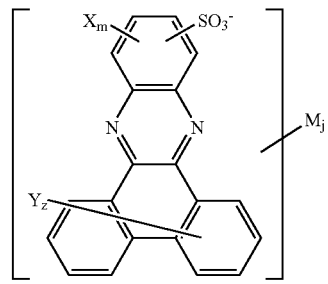

I m = 0,1,2,3
z = 0,1,2,3,4,5,6

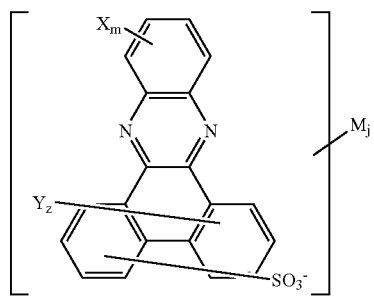

II m = 0,1,2,3,4
z = 0,1,2,3,4,5,6

-continued

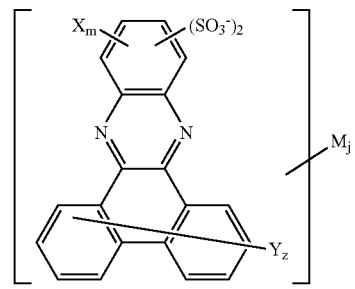

III m = 0,1,2
z = 0,1,2,3,4,5,6

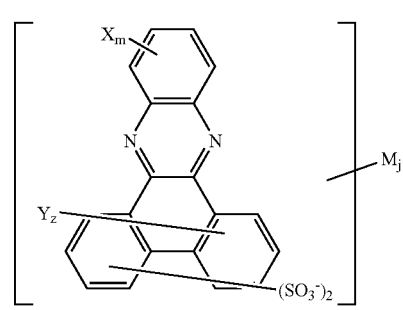

IV m = 0,1,2,3,4
z = 0,1,2,3,4,5,6

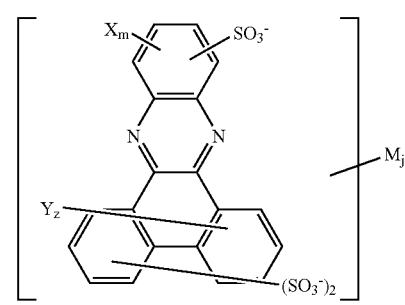

V m = 0,1,2,3
z = 0,1,2,3,4,5,6

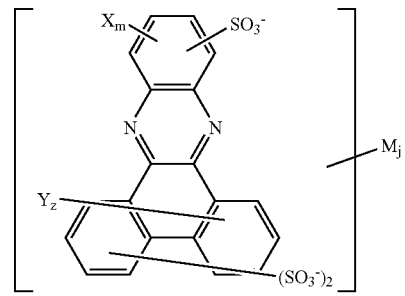

VI m = 0,1,2,3
z = 0,1,2,3,4,5,6

-continued

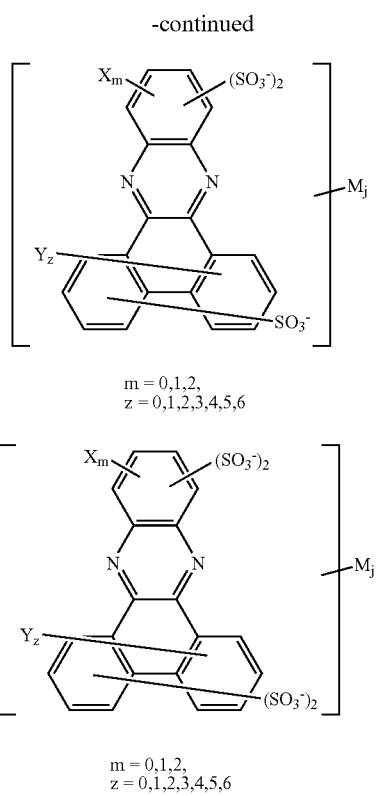

where m=0-2, z=0-6, with X and Y=CH$_3$, C$_2$H$_5$, OCH$_3$, OC$_2$H$_5$, Cl, Br, OH, or NH$_2$; M being a counterion; and j being the number of counterions in the dye molecule, which can be fractional if the counterion is shared among several molecules, and if the number of sulfonic groups is greater than one, different counterions can be involved.

44. The liquid crystal cell according to claim 43, wherein the at least one polarizer layer and at least one discotic film layer have parallel or perpendicular transmission axes.

45. The liquid crystal cell according to claim 43, wherein the at least one discotic film polarizer layer is also a polarizer in the visible wavelength range.

46. The liquid crystal cell according to claim 45, wherein the at least one discotic film layer has the predetermined transmission spectrum which is a combination of spectra of a neutral polarizer and a color correcting polarizer.

47. The liquid crystal cell according to claim 43, wherein the O-type polarizer is an iodine-based polymer polarizer.

48. The liquid crystal cell according to claim 43, wherein the color correcting polarizer further comprises at least one polarizer layer which is an E-Type polarizer.

49. The liquid crystal cell according to claim 48, wherein the E-type polarizer is formed from a lyotropic crystal based on discotic dichroic dye molecules.

50. The liquid crystal cell according to claim 43, wherein the at least one discotic film layer works as an E-type polarizer.

51. The liquid crystal cell according to claim 50, wherein the E-type polarizer layer has negative birefringence.

52. The liquid crystal cell according to claim 43, wherein the at least one discotic film is a thin crystal film polarizer.

53. The liquid crystal cell according to claim 43, wherein the at least one polarizer layer is a thin crystal film.

54. The liquid crystal cell according to claim 43, further comprises an antiglare or antireflection coating placed onto an outer surface of the liquid crystal cell.

55. The liquid crystal cell according to claim 43, further comprises a reflective layer.

56. The liquid crystal cell according to claim 55, wherein at least part of the reflective layer possesses specular reflective properties.

57. The liquid crystal cell according to claim 55, wherein at least part of the reflective layer possesses diffusive reflective properties.

58. The liquid crystal cell according to claim 55, wherein at least part of the reflective layer is transmissive.

59. The liquid crystal cell according to claim 43, wherein the at least one discotic film layer functions as a retarder, or a color filter, or a combination of thereof.

60. The liquid crystal cell according to claim 43, wherein the at least one discotic film layer is applied onto the polarizer inside the cell.

* * * * *